Oct. 21, 1930.  H. G. MOBLEY  1,779,260
PIPE LINE SIGNAL
Filed June 29, 1926   3 Sheets-Sheet 1

Inventor
Henry G. Mobley
By Hardway & Cathey
Attorneys

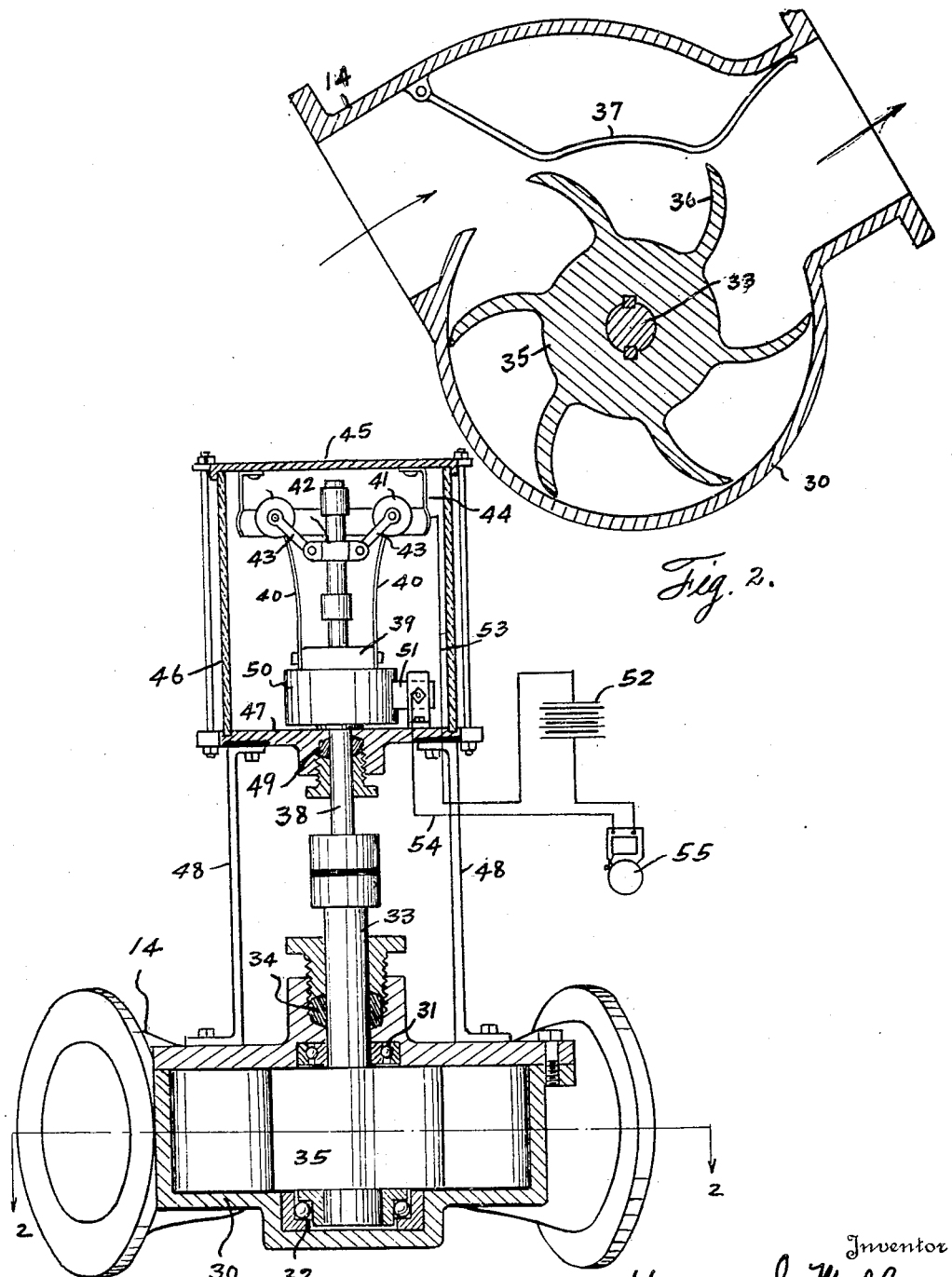

Patented Oct. 21, 1930

1,779,260

UNITED STATES PATENT OFFICE

HENRY G. MOBLEY, OF HOUSTON, TEXAS

PIPE-LINE SIGNAL

Application filed June 29, 1926. Serial No. 119,318.

This invention relates to new and useful improvements in a pipe line signal.

In handling oil delivered through a pipeline to the tanks of a tank farm there is a main line through which the oil is conveyed and branch lines leading from the main line, one to each tank, said branch lines being controlled with suitable valves. At the present time, when it is desired to fill a particular tank, the valve of a branch line leading to it is opened and when the tank is full this valve should be closed and another branch line leading to another tank should be immediately opened to permit the oncoming flow of oil to flow through said last mentioned branch line into the tank. If, when one of the branch lines is closed, another one is not immediately opened there will be no outlet for the oncoming oil, and the pressure thereby caused in the main line will disrupt the joints thereof or burst said line and otherwise injure the apparatus. It is the object of this invention to provide an automatically controlled by-pass line leading from the main line to one of the branch lines and which will be automatically opened when the pressure in the line 1 exceeds a pre-determined limit, and a signal associated with said by-pass to give the workmen warning that oil is flowing through the by-pass thus indicating that all of the branch lines leading to the various tanks are closed.

With the above and other objects in view the invention has particular relation to certain novel features of construction, operation and arrangement of parts, an example of which is given in this specification and illustrated in the accompanying drawings, wherein:—

Figure 2 shows an enlarged transverse sectional view thereof taken on the line 2—2 of Figure 3.

Figure 3 shows an enlarged vertical sectional view of the apparatus, and

Figure 1:
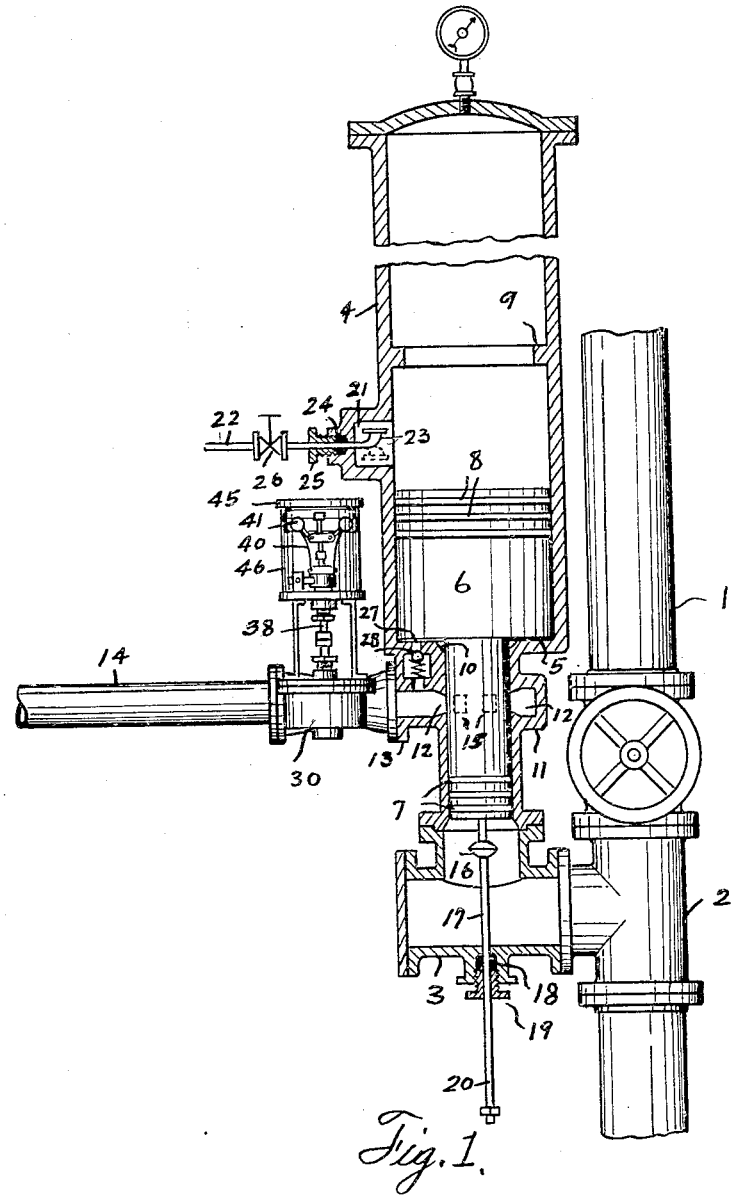
Figure 1 shows a side elevation of the apparatus connected to the branch line leading from the main pipe line.
Figure 4:
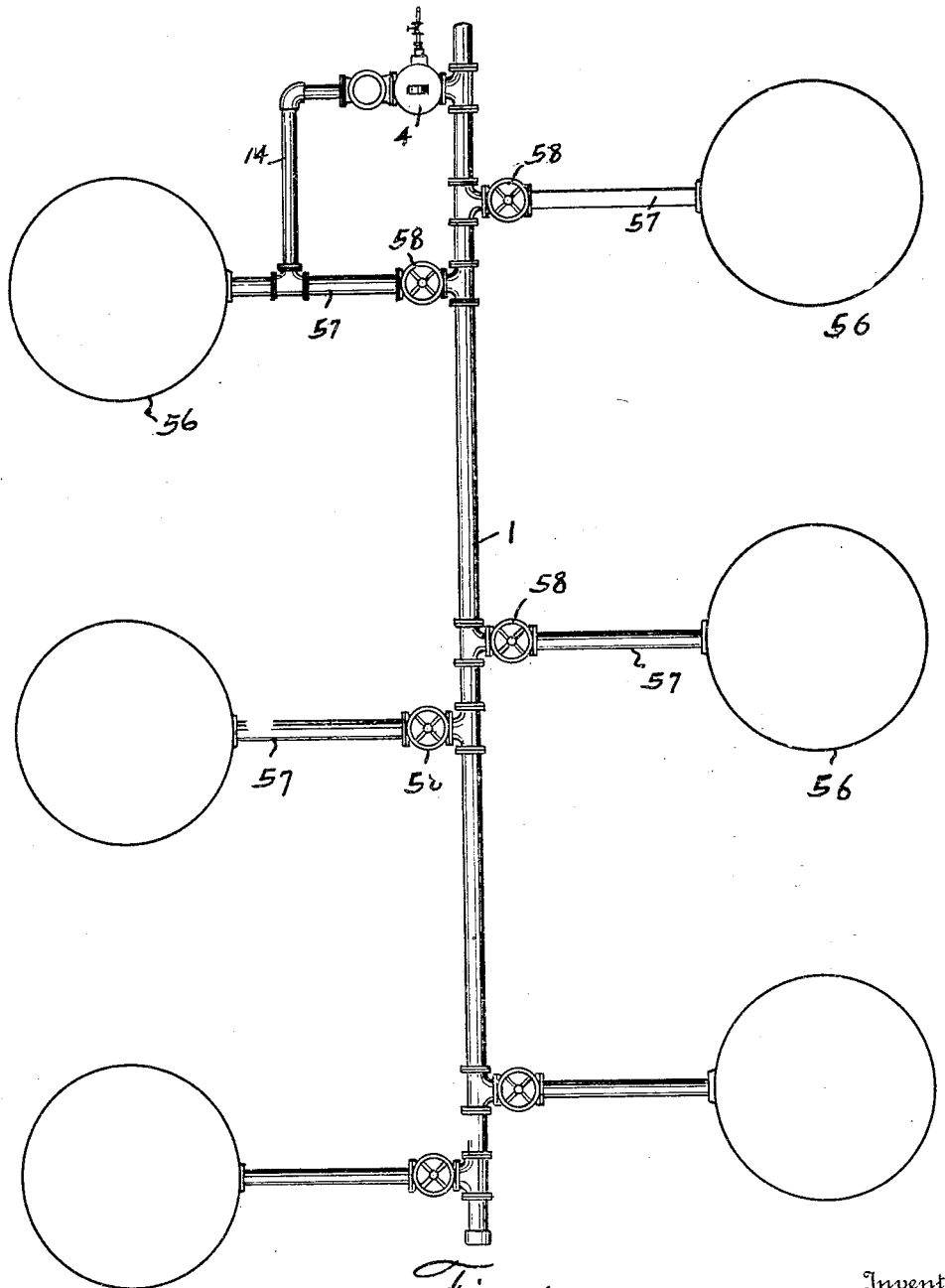
Figure 4 shows a diagrammatic view of a tank farm showing connections of the tanks with the main line and showing the signal installed.

Referring now more particularly to the drawings, wherein like numerals of reference designate similar parts in each of the figures the numeral 1 designates the pipe line for conveying oil to the tanks of a tank farm. Mounted in the line 1 there is a connecting T 2 secured to which there is another T 3 disposed to one side of the main line 1 and into this last mentioned T there is connected the cylinder 4. The connecting end of this cylinder is of a smaller diameter than its outer, or free end, thus forming an internal annular shoulder 5. There is a piston valve 6, correspondingly shaped to the contour of the cylinder, which is operable within said cylinder and is provided with the usual packing rings 7 and 8 at its lower and upper ends to form a tight seal with the interior of the cylinder 4.

Spaced from the outer end of the cylinder there is an internal annular flange 9, which serves as a stop to limit the upward movement of the piston valve, and the shoulder 5 constitutes a stop for the piston valve during its downward movement. The inner margin of the shoulder 5 is chamfered, as at 10, so that the piston rings 7 will not hang thereon during the operation of the piston.

A belt 11 is formed integrally within the smaller end of the cylinder 4 and has an annular chamber 12, therein, connected through the hollow flange connection 13 with the branch pipe 14. The chamber 12 has a number of ports 15 which open into the interior of the cylinder 4 at such a distance from the lower end thereof and from the flange 9 that they are closed when the piston valve 6 is in its lower position and are uncovered when the piston valve is moved to its upper position. A ball joint 16 is connected to the lower end of the piston valve and receives the stem 17 which passes through an aperture in the T 3 and to the exterior; this aperture is closed against leakage by suitable packing 18 having a jamb nut 19. The outer end 20, of the stem 17 serves as a gauge and the distance, or extent, that its end 20 projects to the exterior is an indication of the position of the valve 6 within the interior of the cylinder 4. The ball joint 16 corrects for any slight irregularities in assembly.

A cavity 21 is formed in the wall of the cylinder 4 a sufficient distance above the ports 15 so that it is always closed by the piston valve 6 in its upper position, but is uncovered by this valve when the latter passes to lower position. A pipe 22 passes through the wall of the cylinder 4 into the cavity 21 and its inner end carries an elbow 23 for the purpose of regulating the level of the oil within the upper portion of the cylinder 4, as will be hereinafter described.

The pipe 22 passes through the packing 24 and a jamb nut 25 which maintains a tight sealing of the pipe with respect to the interior of the cylinder 4. A valve 26 is provided in the pipe 22 to shut it off at will.

There is a port 27 leading from the chamber 12 up through the shoulder 5 and said port is controlled by the back pressure valve 28.

When the piston valve is drawn down to its lower position, that is, with its enlarged portion seated against the shoulder 5 by pulling on the rod 20, if necessary, or any other suitable manner a quantity of lubricating oil is forced through the pipe 22 and is received on top of the piston valve 6 and in the cavity 21 and thereafter serves to assure tightness of the piston valve 6 within the cylinder 4. Air, under compression, is then forced into the outer portion of the cylinder 4 through the pipe 22 until a predetermined pressure is obtained. The pipe 22 is then rotated within the packing 24 and the nut 25 until it is in the position shown in dotted lines in Figure 1; the valve 26 is maintained closed, except while oil or air is being introduced into the cylinder 4.

The main pipe line 1 is connected with the tanks 56, of the tank farm through branch lines, as 57, which are controlled by the valves 58. What it is desired to fill a tank the corresponding valve 58 is opened and when the tank is filled said valve is closed but at or before the time of its closing another valve 58 should be opened to provide an outlet for the oncoming stream of oil in the line 1 as otherwise the pressure will accumulate in said line sufficient to burst it. Due to carelessness of workmen one valve is sometimes closed before the other one is opened and with my improved attachment, herein described, when this occurs the pressure accumulating in the line 1 will operate to lift the valve 6 and uncover the ports 15 and the oil will flow from the line 1 through said ports and through the by-pass line 14 and into one of the branch lines 57 beyond the valve 58 thus operating temporarily to relieve the line 1 of excess pressure. The fluid flowing through the by-pass line 14 will also operate a signal, presently to be described, so that the workmen will be constantly warned that the oil in the line 1 is not being delivered to any of the tanks 56, except such as is passing through the by-pass line 14.

Incorporated into the line 14 there is a circular casing 30 with the vertically aligned bearings 31, 32, therein and a vertically extending shaft 33 works in said bearings, a fluid tight joint being maintained around said shaft by a suitable stuffing box 34. Within the casing 30 and fixed on the shaft 33 there is a turbine 35 having the curved impeller blades 36 against which the current of fluid flowing through the line 14 impinges to rotate said turbine and shaft 34. The pipe 14 has a yieldable supplemental wall 37 opposite the turbine, which under excessive fluid pressure will yield back from the turbine to give a freer passage for the fluid through the pipe 14. Connected to and aligned with the shaft 33, and insulated therefrom there is a governor shaft 38 which has an anchor 39 fixed thereon and upstanding from which are the yieldable arms 40, 40, whose ends carry the centrifugal governor balls 41, 41. Above the anchor 39 there is a collar 42 which is slidable on the shaft 38 and this collar is connected to the respective balls 41 through the respective links 43, 43. As the turbine rotates the anchor 39 will rotate with it, through the mechanism described, and the balls will be thrown outwardly by centrifugal force and will successively contact with the arcuate contact tongue 44 which is secured to a metal cap 45 of the casing 46 which surrounds and protects the mechanism therein. The casing 46 is preferably formed of glass and is mounted on the metallic end plate 47 which is supported by suitable metallic legs 48 upstanding from the casing 31 and insulated from the plate 47. The shaft 38 works through a suitable stuffing box 49 in the end plate 47 and has a contact disc 50 fixed thereon in constant contact with the brush 51 carried by the end plate 47.

There is a storage battery 52, or other source of electrical supply, with an electric conductor 53 leading from said battery to the contact tongue 44 and another electrical conductor 54 leading from said battery to the brush 51 and this battery is wired in circuit and with an electrical signal 55.

As the turbine 35 rotates the balls 41 fly outwardly by centrifugal force and as they rotate will successively contact with the tongue 44 to complete an electric circuit through the signal device 55 and warning will thereby be given to the workmen that oil is flowing through the line 14.

As the piston valve 6 rises in the cylinder 4 there will be an annular chamber formed between the shoulder 5 and the opposing part of the enlarged end of the piston valve and a partial vacuum will be formed in such chamber and the check valve 28 has been provided to prevent the back flow of fluid from the passage 23 up into said chamber, but there will be a certain amount of leakage up past the reduced end of the valve 6 into this chamber and as the piston valve 6 moves downwardly this fluid will be forced out of said chamber through the port 27 and into the line 14.

It will be understood that the invention is not limited to the specific embodiment shown but that it may be modified within the scope of the appended claims.

What I claim is:—

1. A fluid conducting system including a plurality of containers, a main fluid conducting line, branch lines connecting the respective containers with said main line, a valve controlling each branch line, a by pass line leading from the main line and connected into one of said branch lines between the valve thereof, and the corresponding container, a pressure alleviator connected into said by pass line, an electrical circuit, a source of electrical energy and an annunciator connected into said circuit, a switch for completing and breaking said circuit, and means arranged to be actuated by the fluid flowing through the by pass and effective to close said switch.

2. The combination with a plurality of containers of a main fluid conducting line and branch lines connecting the respective containers with said main line, a bypass line leading from the main line and connected into one of said branch lines between the valve thereof and the corresponding container, an annunciator, means operable by the fluid flowing through said bypass line and effective to operate said annunciator.

3. The combination with a plurality of containers of a main fluid conducting line and branch lines connecting the respective containers with said main line, a bypass line leading from the main line and connected into one of said branch lines between the valve thereof and the corresponding container, an annunciator, means operable by the fluid flowing through said bypass line and effective to operate said annunciator, and a pressure controlling device incorporated into the bypass line between the main line and the annunciator operating means.

4. A device of the character described including a plurality of containers, a main line, branch lines connecting the respective containers into the main line, an electrical circuit, a source of electrical energy and an annunciator connected into said circuit, a switch for completing and breaking said circuit and means arranged to be actuated by the fluid flowing from the main line into one of said containers and effective to close said switch.

In testimony whereof I have signed my name to this specification.

HENRY G. MOBLEY.